United States Patent
Madilao et al.

(10) Patent No.: US 12,548,637 B1
(45) Date of Patent: Feb. 10, 2026

(54) PARALLEL TIMING MARGIN TESTING OF MEMORY DEVICES

(71) Applicant: Apple Inc., Cupertino, CA (US)

(72) Inventors: Romi Madilao, Cupertino, CA (US); Jaret R. Stillman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 89 days.

(21) Appl. No.: 18/485,900

(22) Filed: Oct. 12, 2023

Related U.S. Application Data (60) Provisional application No. 63/584,544, filed on Sep. 22, 2023.

(51) Int. Cl.
  *G11C 29/44* (2006.01)
  *G11C 29/12* (2006.01)
  *G11C 29/46* (2006.01)

(52) U.S. Cl.
  CPC ........ *G11C 29/44* (2013.01); *G11C 29/12015* (2013.01); *G11C 29/46* (2013.01)

(58) Field of Classification Search
  CPC .... G11C 29/44; G11C 29/12015; G11C 29/46
  See application file for complete search history.

(56) References Cited

U.S. PATENT DOCUMENTS

| | | | |
|---|---|---|---|
| 7,958,412 B2 | 6/2011 | Jeddeloh et al. | |
| 8,806,245 B2 | 8/2014 | Machnicki et al. | |
| 9,036,448 B2 | 5/2015 | Nagata et al. | |
| 9,087,615 B2 | 7/2015 | Cordero et al. | |
| 9,535,119 B2 | 1/2017 | Thiruvengadam et al. | |
| 11,233,589 B2 | 1/2022 | Ho et al. | |
| 2014/0075146 A1* | 3/2014 | Lee | G06F 1/14 |
| | | | 711/170 |
| 2022/0276788 A1 | 9/2022 | Li et al. | |

* cited by examiner

*Primary Examiner* — Xiaochun L Chen
(74) *Attorney, Agent, or Firm* — Sterne, Kessler, Goldstein & Fox P.L.L.C.

(57) ABSTRACT

The present disclosure describes systems and methods for determining timing margins in parallel for a plurality of byte lanes coupling a memory device to a memory controller circuit. Memory testing can be performed on multiple byte lanes in parallel to detect a memory test failure event for one or more failing byte lanes. In response to detecting the memory test failure event for the one or more failing byte lanes, a timing margin for the one or more failing byte lanes can be determined. Additional memory testing can be performed to determine the timing margins for the remaining byte lanes while calibrated state signals are provided to the byte lanes with already determined timing margins.

20 Claims, 6 Drawing Sheets

PARALLEL TIMING MARGIN TESTING OF MEMORY DEVICES

RELATED APPLICATIONS

This application claims benefit of U.S. Provisional Patent Application No. 63/584,544 filed Sep. 22, 2023, the content of which is herein incorporated by references in its entirety.

FIELD

The present disclosure relates to timing margin testing for memory devices.

BACKGROUND

A computing system can include various devices, such as a memory device connected to one or more processors, where the memory device can be controlled by one or more memory controller circuits via channels or byte lanes. The memory device needs to meet certain timing requirements to properly execute commands. Otherwise, data corruption and system instability can occur.

During device configuration, a memory controller circuit can calibrate the memory device to ensure a stable communication is established for each byte lane connected to the memory device. However, timing margins, such as setup margins and hold margins of the memory device, may degrade over time due to effects such as frequency, temperature, aging, and other effects. Accordingly, the memory device may develop incorrect timing margins, leading to errors in the memory device and adversely affecting system performance.

SUMMARY

Embodiments of the present disclosure include a system for timing margin testing and determination in parallel for multiple byte lanes of multiple channels of a memory device coupled to one or more processors or processor circuits. Memory testing can be performed on multiple byte lanes of the multiple channels in parallel to detect a memory test failure event for one or more failing byte lanes. In response to detecting the memory test failure event for the one or more failing byte lanes, a timing margin for the one or more failing byte lanes can be determined. In some embodiments, the system can be a system-on-chip (SOC), including multiple processors and a memory controller circuit to control a memory device.

Embodiments of the present disclosure include a system including a processor circuit, a memory device, and a memory controller circuit configured to control data transfer between the processor circuit and the memory device over a plurality of byte lanes of one or more channels, within which there may be other parallel data streaming architectures such as rank. In some embodiments, the memory device can include a dynamic random access memory (DRAM) or any other suitable calibrated memory device. The memory controller circuit and the processor circuit can be included in a system-on-chip (SOC), where the SOC is configured to be in a functional mode disabled from calibration of the memory device during a memory test being performed on the memory device for memory timing margin purpose. In some embodiments, the SOC can be in the functional mode with periodic calibrations enabled. The periodic calibrations can be disabled during the memory timing margin test and then re-enabled upon completion of the memory timing margin test. For regular memory tests that is not timing margin related, the periodic calibrations can be kept enabled.

In some embodiments, the processor circuit can be configured to perform a memory test in parallel on the plurality of byte lanes to detect a memory test failure event for one or more failing byte lanes of the plurality of byte lanes, or a memory test success event for all of the plurality of byte lanes. The memory test can be performed by providing a first set of data signals to the plurality of byte lanes, where the first set of data signals are shifted by a first margin delay with respect to a calibrated state signal. In response to a detection of the memory test success event for all of the plurality of byte lanes, the processor circuit can be configured to repeat the memory test in iteration by providing a second set of data signals to the plurality of byte lanes, where the second set of data signals are shifted by a second margin delay different from the first margin delay.

In some embodiments, a difference between the first margin delay and the second margin delay can include a single delay unit based on a clock signal of the system. In some embodiments, a difference between the first margin delay and the second margin delay can include multiple delay units based on a clock signal of the system. A difference between the first margin delay and the second margin delay can be determined based on, for example, a binary search pattern or a linear search.

In some embodiments, in response to detecting the memory test success event for all of the plurality of byte lanes, the processor circuit can be configured to repeat the memory test in iteration. To repeat the memory test in iteration, the processor circuit can be further configured to repeat the memory test by providing a third set of data signals to the plurality of byte lanes, where the third set of data signals are shifted by another margin delay different from the first margin delay or the second margin delay. The processor circuit can be further configured to repeat the memory test with a set of data signals having an updated margin delay based on a prior iteration of the memory test until the memory test failure event is detected for one or more failing byte lanes. In addition, the processor circuit can be further configured to repeat the memory test with a set of data signals until a memory test failure event has been detected on all byte lanes.

In some embodiments, in response to detecting the memory test failure event for the one or more failing byte lanes, the processor circuit can be configured to determine a timing margin for the one or more failing byte lanes, where the timing margin represents a maximum shift in a second data signals provided to the one or more failing byte lanes that avoids the memory test failure event during the memory test. In some embodiments, the timing margin can be a difference between a start time of the calibrated state signal determined by a clock signal of the system and a prior iteration of the memory test with the detection of the memory test success event for all of the plurality of byte lanes before the detection of the memory test failure event for the one or more failing byte lanes.

In some embodiments, in response to detecting the memory test failure event for the one or more failing byte lanes, the processor circuit can be configured to determine memory test failure addresses within the memory device causing the memory test failure event and further identify the one or more failing byte lanes among the plurality of byte lanes corresponding to the memory test failure addresses. In addition, the processor circuit can be configured to determine the timing margin for the one or more failing byte lanes. The timing margin for the one or more failing byte lanes can be a smallest timing margin among the plurality of byte lanes.

In some embodiments, the memory test can be based on a memory test pattern to detect the memory test failure event for the one or more failing byte lanes. The processor circuit can be configured to read content of the memory device at locations of the memory test pattern and compare the content at the locations of the memory test pattern with expected content of the memory device at the locations to determine failing locations (e.g., where content of the failing locations do not match the expected content at the failing locations). Afterwards, the processor circuit can be configured to translate the failing locations to the one or more failing byte lanes.

In some embodiments, the memory test can be based on a buffer test with a first buffer and a second buffer to detect the memory test failure event for the one or more failing byte lanes. The processor circuit can be configured to compare content of the first buffer to content of the second buffer to determine whether the content of the first buffer matches the content of the second buffer. In response to determining that the content of the first buffer does not match the content of the second buffer, the processor circuit can be configured to detect memory test failure addresses by replaying the buffer test. In some embodiments, the processor circuit can be configured to replay the buffer test up to one of the failing addresses, determine the expected value at the failing addresses, and further compare the two failing addresses to the expected value to determine whether one, or both, of the addresses have a failure.

In some embodiments, the one or more failing byte lanes is a first set of failing memory byte lanes and the timing margin for the one or more failing memory byte lanes is a first timing margin. The processor circuit can be further configured to restore the calibrated state signal to the first set of failing memory byte lanes and to repeat the memory test in parallel on remaining byte lanes of the plurality of byte lanes without testing the first set of failing memory byte lanes to detect another memory test failure event or to detect the memory test success event for all of the plurality of byte lanes. In response to detecting the other memory test failure event for one or more of the remaining byte lanes, the processor circuit can be configured to determine a second set of failing memory byte lanes and determine a second timing margin for the second set of failing memory byte lanes. The second timing margin can indicate a data signal provided to the second set of failing memory byte lanes causes a memory test failure event when the data signal is shifted by a delay more than the second timing margin.

In some embodiments, a method to determine a time margin in parallel for multiple byte lanes can include performing a memory test in parallel on a plurality of byte lanes to detect a memory test failure event for one or more failing byte lanes of the plurality of byte lanes or a memory test success event for all of the plurality of byte lanes. The plurality of byte lanes can be accessible by a processor circuit and couple a memory device to a memory controller circuit. In some embodiments, the processor circuit can be implemented by any hardware processing component that communicates with the memory device. The memory test can be performed by providing a first set of data signals to the plurality of byte lanes, where the first set of data signals can be shifted by a first margin delay with respect to a calibrated state signal. In response to detecting the memory test success event for all of the plurality of byte lanes, the method can include repeating the memory test in iteration by providing a second set of data signals to the plurality of byte lanes, where the second set of data signals are shifted by a second margin delay different from the first margin delay.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

A computing system can include various devices, such as a memory device connected to one or more processors, where the memory device can be controlled by one or more memory controller circuits coupled to the memory device via a plurality of channels or byte lanes. A system-on-chip (SOC) can be an integrated circuit that integrates multiple components of a computing system, such as on-chip central processing unit (CPU), memory interfaces, memory controller circuits, input/output devices, input/output interfaces, secondary storage interfaces, radio modems, a graphics processing unit (GPU), or other components. A CPU, GPU, or other processing component may be referred to as "a processor core," "a processor," or "a processor circuit" herein. In some embodiments, a memory device can be coupled to the SOC through a memory interface. The memory device needs to meet certain timing requirements to properly execute commands when coupled to the computing system. During device configuration, a memory controller circuit can calibrate the memory device to ensure stable communication is established for each byte lane connected to the memory device. However, timing margins of the memory device may degrade over time. Accordingly, it is important to determine the timing margins for the memory device to ensure the memory device meets timing requirements.

Embodiments of the present disclosure include a system for timing margin testing and determination in parallel for multiple byte lanes of multiple channels of a memory device coupled to one or more processor circuits. Data signals are provided to the multiple byte lanes in parallel to perform a memory test on the multiple byte lanes, where the data signals have a margin delay with respect to a calibrated state signal. One or more byte lanes with the smallest time margin can induce a memory test failure event. These byte lanes may be referred to herein as "failing byte lanes," and the timing margin represents a maximum shift in data signals provided to the failing byte lanes that avoids the memory test failure event during the memory test. Embodiments herein can identify one or more failing byte lanes first among the plurality of byte lanes of the memory device. In response to detecting the memory test failure event for the one or more failing byte lanes, a timing margin for the one or more failing byte lanes can be determined. Afterwards, calibrated state signals can be provided to the one or more failing memory byte lanes having timing margins already determined, and the memory test can be repeated in parallel on remaining byte lanes to detect timing margins for the remaining byte lanes without retesting the one or more failing memory byte lanes having their timing margins already determined. Benefits of the disclosed embodiments, among others, include an increased efficiency and a reduced cost in comparison to testing the timing margins of multiple byte lanes one by one in sequence.

Figure 1A:
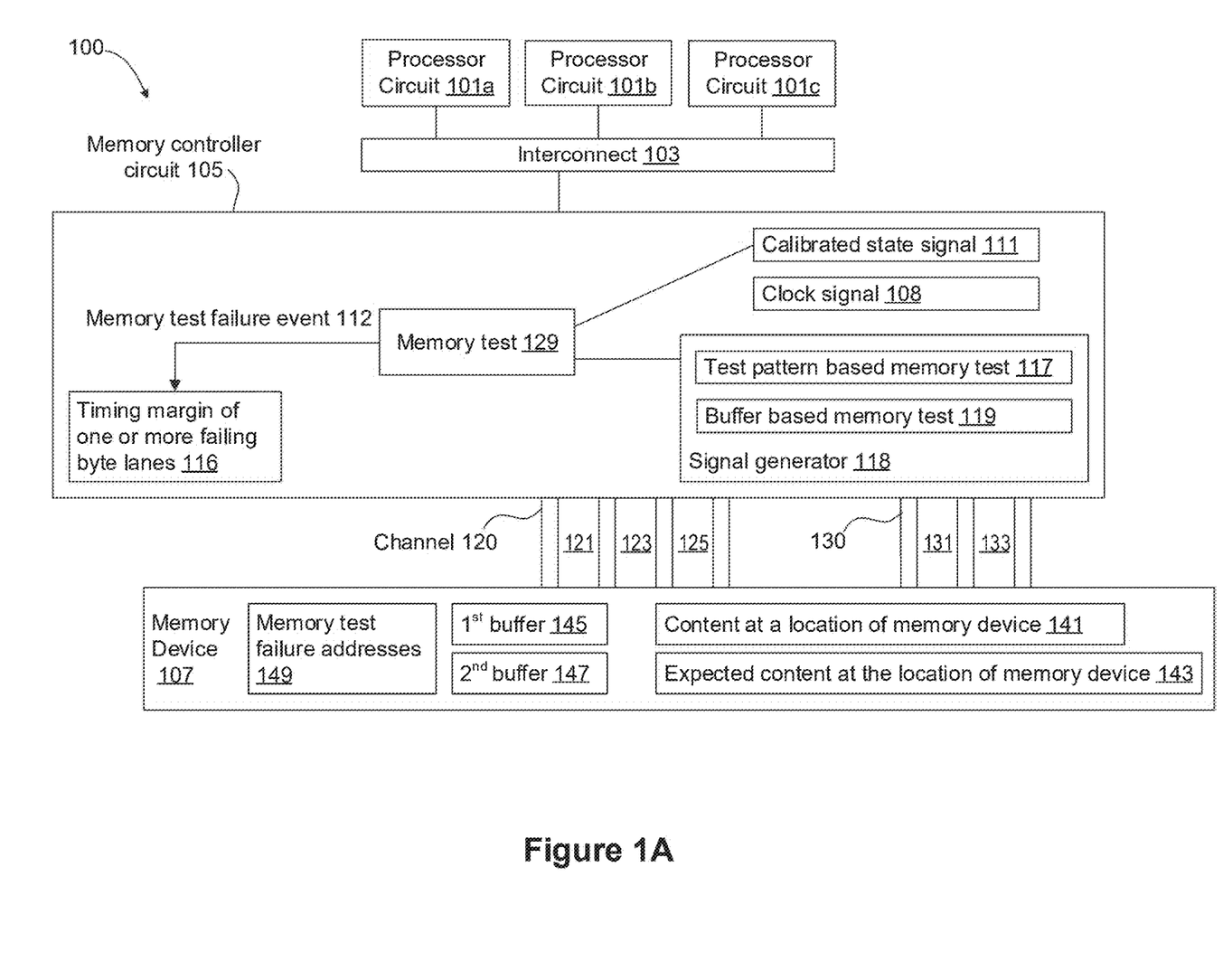
FIG. 1A is an illustration of an electronic system including a processor circuit to perform timing margin testing in parallel for multiple byte lanes of a memory device, according to some embodiments.
Figure 1B:
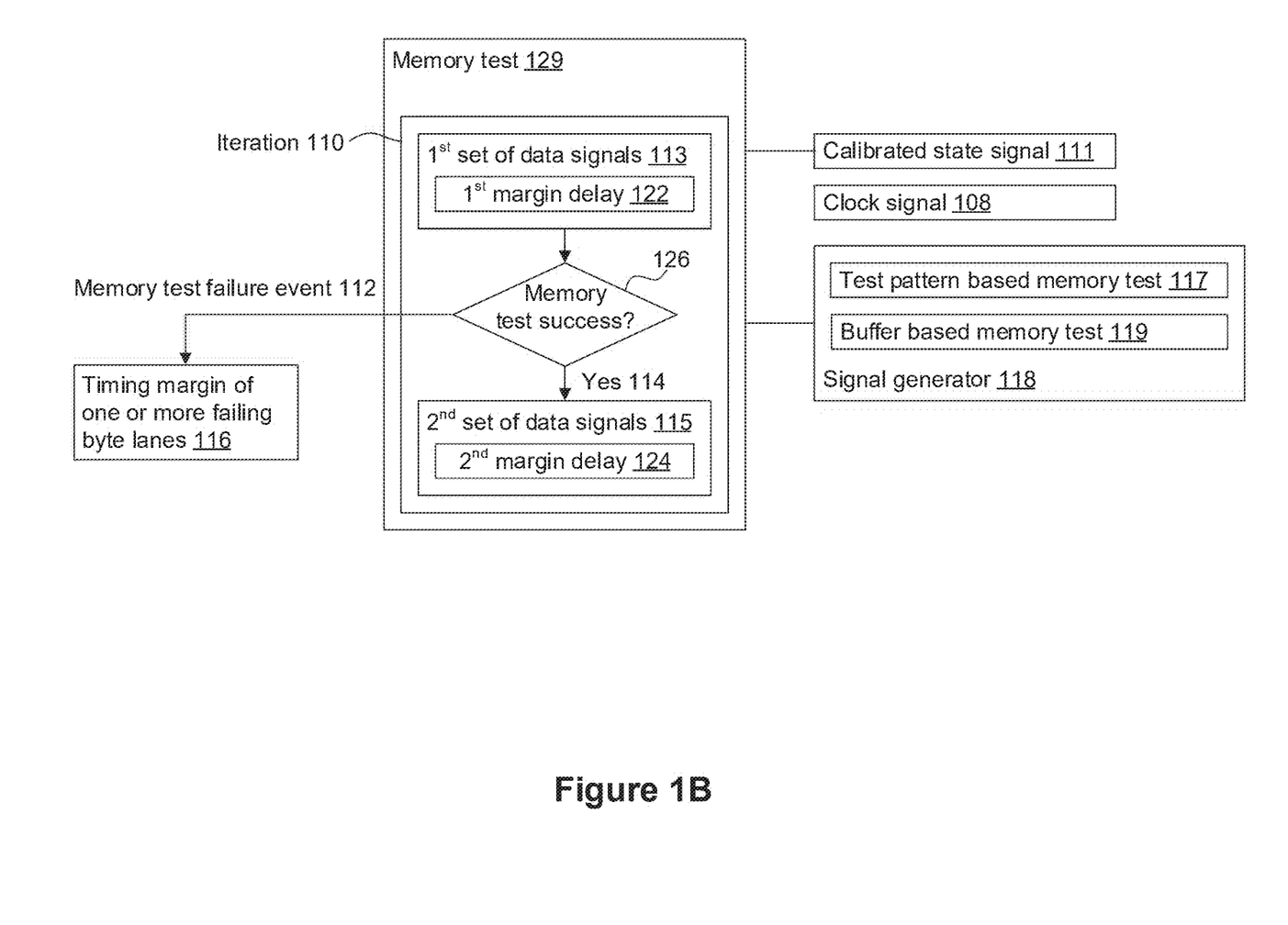
FIG. 1B is an illustration of a process for performing timing margin testing in parallel for multiple byte lanes of a memory device, according to some embodiments.

FIG. 1A is an illustration of an electronic system 100 including a processor circuit to perform timing margin testing in parallel for multiple byte lanes of a memory device 107, according to some embodiments. FIG. 1B is an illustration of a process for performing timing margin testing in parallel for multiple byte lanes of a memory device, which can be performed by the processor circuit of electronic system 100.

In some embodiments, as shown in FIG. 1A, electronic system 100 can include one or more processor circuits, such as processor circuit 101a, processor circuit 101b, processor circuit 101c, which are coupled to memory device 107 through an interconnect 103 and a memory controller circuit 105. In some embodiments, memory device 107 can include a dynamic random access memory (DRAM) or any calibrated memory device. The processor circuits may each be referred to herein as "a processor core," "a processor," "a core," or other suitable names. Similarly, memory controller circuit 105 may be referred to herein as "a memory controller" or "a controller." Among the processor circuits, one of the processor circuits may be a primary processor circuit, while the other processor circuits may be secondary processor circuits. For the description below, functions may be described for processor circuit 101a, while the same functions can be performed by other processor circuits.

Memory controller circuit 105 and processor circuit 101a can be included in a SOC, where memory device 107 can be coupled to the SOC through a memory interface of the SOC. A processor circuit, such as processor circuit 101a, can be configured to perform a memory test on memory device 107. In some embodiments, the SOC including memory controller circuit 105 and processor circuit 101a can be configured to be in a functional mode to perform certain functions (e.g., computations for communication, image processing, security applications, and other suitable applications) and can be disabled from calibration of memory device 107 during a memory test performed on memory device 107. Functions described below performed by processor circuit 101a or memory controller circuit 105 can be alternatively performed by only one or both of processor circuit 101a and memory controller circuit 105.

In some embodiments, memory controller circuit 105 can be configured to control data transfer between processor circuit 101a and memory device 107 over a plurality of byte lanes of one or more channels. Referring to FIG. 1A, a channel 120 can include a byte lane 121, a byte lane 123, and a byte lane 125. Similarly, a channel 130 can include a byte lane 131 and a byte lane 133. Channel 120 and channel 130 can couple memory controller circuit 105 with memory device 107 so that data or control information can be transferred between processor circuit 101a and memory device 107. In some embodiments, channel 120 or channel 130 can be formed through a memory interface on the SOC where memory controller circuit 105 is located. Channel 120 or channel 130 can be a part of a communication bus, an address bus, a data channel, or a control channel. In some embodiments, channel 120 includes multiple byte lanes so that timing margin testing is performed in parallel for multiple byte lanes. A byte lane, such as byte lane 121, can include multiple bit lines to transfer multiple bits of information simultaneously.

In some embodiments, in a process of reading or writing data between memory controller circuit 105 and memory device 107 through channel 120 or channel 130, a data signal (DQ) and a data strobe signal (DQS) can be transmitted through channel 120 or channel 130. A data value may be sampled from the DQ at an edge of the DQS to obtain an analog value. Based on the sampled data value and a reference voltage provided by a reference power source, a digital value of data can be determined by decoding the sampled value of the DQ. To ensure that the DQ is correctly sampled, the edge of the DQS needs to be aligned with an edge or a central position of the DQ. However, as a data transmission rate of channel 120 or channel 130 increases, a DQS cycle and a DQ cycle are shortened. Accordingly, the sampled value of the DQ at the edge or at the center of the data eye may be misaligned with an edge of the DQS, which can lead to a sample error.

In some embodiments, a signal eye pattern or data window of the DQ received can be tested using, for example, an oscilloscope. A timing margin of the DQ can be measured based on the signal eye pattern, where the timing margin is a time range within which the DQ remains valid each cycle. When the DQ is received within the allowed timing margin, the DQ can be correctly decoded to obtain its digital value from the sampled analog value. When the DQ is received outside the allowed timing margin, the decoded digital data value can be an error. To avoid such errors caused by sampling outside the timing margin and to ensure reliability of memory read and write operations, memory device 107 may be calibrated by a related parameter, such as a timing of DQS or a reference voltage, based on the timing margin of the DQ obtained through measurement.

In some embodiments, among the multiple byte lanes, such as byte lane 123, byte lane 125, byte lane 131, byte lane 133, the timing margin for different byte lanes can be different. In some embodiments, the timing margin of a byte lane can be tested one by one for byte lane 123, byte lane 125, byte lane 131, and byte lane 133. Such a sequential approach can be costly for electronic system 100. In some embodiments, techniques are presented herein to test in parallel the timing margin of byte lane 123, byte lane 125, byte lane 131, and byte lane 133. Accordingly, embodiments herein can present improvements in efficiency while reducing the cost of timing margin testing. In some embodiments, techniques presented herein are not for calibration purposes, but rather for characterization and failure analysis purposes.

In some embodiments, processor circuit 101a can be configured to perform a memory test 129 in parallel on the plurality of byte lanes, such as byte lane 121, byte lane 123, byte lane 125, byte lane 131, and byte lane 133, to detect a memory test failure event or a memory test success event. A timing margin of one or more failing byte lanes 116 can be determined when a memory test failure event 112 is detected for the one or more failing byte lanes. Since individual byte lanes can have different timing margins, the memory test can have a memory test failure event at different times for different byte lanes. Memory test failure event 112 may occur for one or more failing byte lanes of the plurality of byte lanes coupling memory controller circuit 105 and memory device 107. In other words, memory test failure event 112 can occur when there is one byte lane causing the memory test failure. For example, a memory test failure event may occur to one failing byte lane 121, while other byte lanes, such as byte lane 123, byte lane 125, byte lane 131, byte lane 133, may have memory test success. On the other hand, a memory test success event can occur when all of the plurality of byte lanes being tested can pass the memory test, without any byte lane causing a memory test error.

Figure 2A:
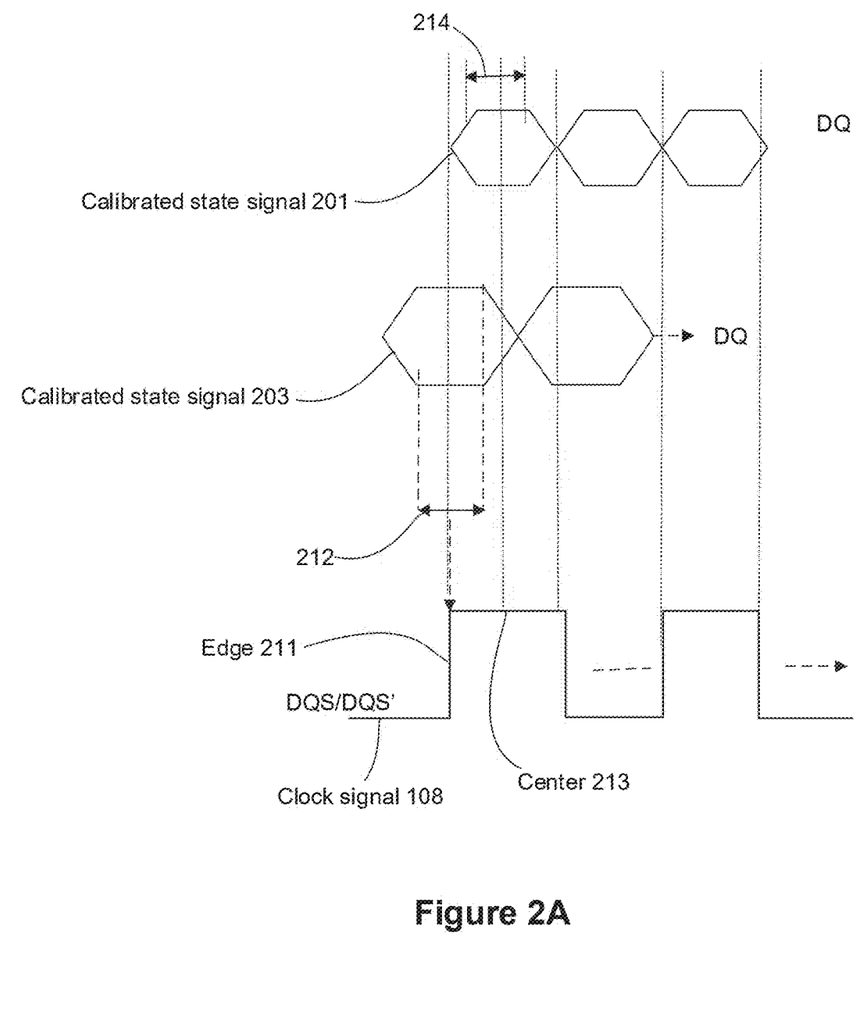
FIGS. 2A-2C are illustrations of data signals and a calibrated state signal used for performing timing margin testing, according to some embodiments.

In some embodiments, referring to FIG. 1B, processor circuit 101a, memory controller circuit 105, individually or in combination, can be configured to perform memory test 129 by providing a first set of data signals 113 to the plurality of byte lanes, where first set of data signals 113 are shifted by a first margin delay 122 with respect to a calibrated state signal 111 defined with respect to clock signal 108. Accordingly, first set of data signals 113 can be referred to herein as "memory test signals." Examples of calibrated state signal 111 are shown in FIG. 2A, such as a calibrated state signal 201 or a calibrated state signal 203. A DQS can be provided by clock signal 108. Calibrated state signal 201 and clock signal 108 are transmitted edge-aligned, such that an edge 214 of data transmitted by calibrated state signal 201 is aligned to an edge 211 of clock signal 108. In addition, calibrated state signal 203 and clock signal 108 are transmitted center-aligned, where a data window 216 of data being transmitted by calibrated state signal 203 is aligned to edge 211 of clock signal 108 so that a center of data window 216 is positioned at a same location as edge 211 of clock signal 108, while an edge 215 of calibrated state signal 203 is shifted 90 degree from edge 211 of clock signal 108. Descriptions below may focus on calibrated state signal 201 that is edge-aligned with clock signal 108. Operations can be performed similarly if calibrated state signal 203 is used instead of calibrated state signal 201. As shown in FIG. 2A, a data value may be captured or sampled at the middle of the DQ data window, which can be data window 216.

Initially, first set of data signals 113 can be the same as calibrated state signal 111 with a margin delay 0. In some embodiments, first set of data signals 113 can be generated by a signal generator 118. There can be different kinds of memory test performed, such as test pattern based memory test 117 and buffer based memory test 119, where the memory test signals can be generated by signal generator 118. In some embodiments, processor circuit 101a can be configured to instruct memory controller circuit 105 to generate the memory test signals, such as first set of data signals 113 generated based on test pattern based memory test 117 or buffer based memory test 119. In some embodiments, processor circuit 101a can be configured to generate test pattern based memory test 117 or buffer based memory test 119 and send the generated memory test signals to memory controller circuit 105. In some embodiments, the memory test signals generated by signal generator 118, such as first set of data signals 113, can be sent to memory device 107 to perform the memory test.

In some embodiments, after memory test 129 is performed, at 126, processor circuit 101a or memory controller circuit 105 can analyze the testing result of the memory test to determine the memory test result is memory test success event 114 for all of the plurality of byte lanes or memory test failure event 112 for one or more failing byte lanes. In some embodiments, to determine whether a memory test result produces a success event or a failure event, test pattern based memory test 117 or buffer based memory test 119 can be used to compare memory contents at different locations.

In some embodiments, in response to a detection of memory test success event 114 for all of the plurality of byte lanes coupling memory controller circuit 105 and memory device 107, processor circuit 101a can be configured to perform an additional memory test in iteration 110 by providing a second set of data signals 115 to all of the plurality of byte lanes, where second set of data signals 115 are shifted by a second margin delay 124 different from the first margin delay 122. Accordingly, memory test 129 can include iteration 110 that can include repeated memory tests with different data signals. In some embodiments, memory test 129 may refer to an iteration of the memory tests. Once second set of data signals 115 are generated, e.g., by signal generator 118, second set of data signals 115 can become a new first set of data signals to be fed to memory device 107 controlled by memory controller circuit 105. In some embodiments, signal generator 118 can be provided by hardware that does the initial calibration or by external circuitry. Similarly, a new memory test iteration can be performed by memory controller circuit 105, and the memory test result can be analyzed to determine it is memory test success event 114 or memory test failure event 112.

In some embodiments, in response to a detection of memory test success event 114 and to repeat the memory test in iteration 110, processor circuit 101a can be further configured to repeat the memory test by providing a third set of data signals to the plurality of byte lanes, where the third set of data signals are shifted by another margin delay different from first margin delay 122 or second margin delay 124. Processor circuit 101a or memory controller circuit 105 can be further configured to repeat the memory test with a set of data signals having an updated margin delay based on a prior iteration of the memory test until the memory test failure event is detected for the one or more failing byte lanes.

Figure 2B:
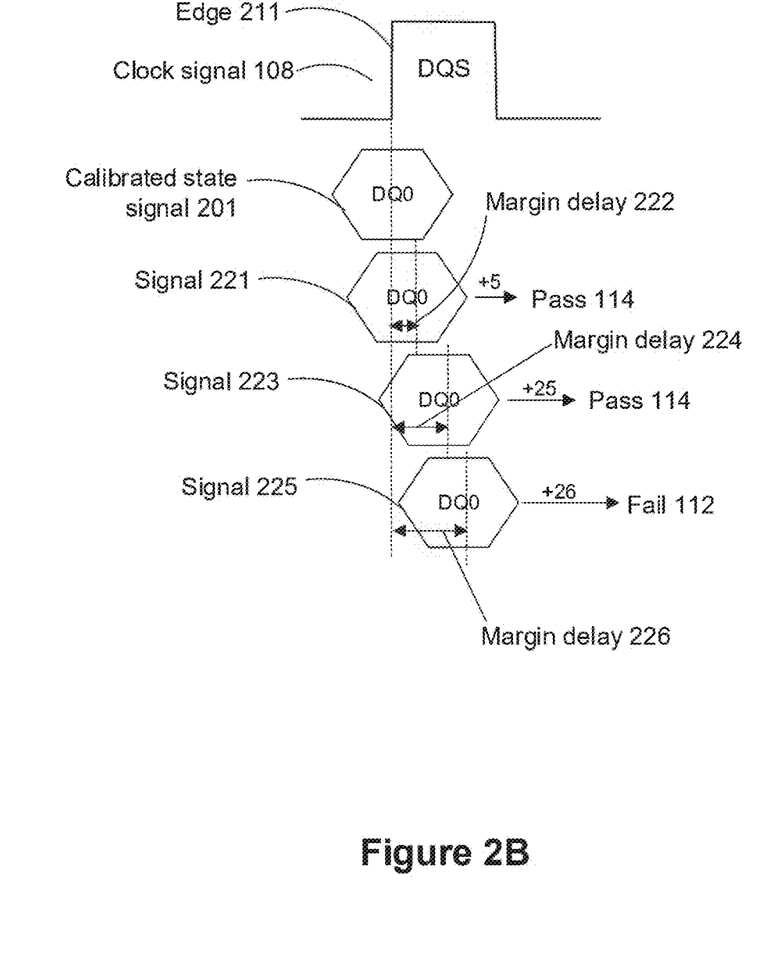

In some embodiments, examples of first set of data signals 113 with first margin delay 122 and second set of data signals 115 with second margin delay 124 are shown in FIG. 2B. Clock signal 108 can be the DQS transmitted through channel 120 or channel 130 together with a DQ, which can be a calibrated state signal 201, a signal 221, a signal 223, a signal 225, or other data signals. Signal 221, signal 223, and signal 225 can be examples of first set of data signals 113 or second set of data signals 115. Signal 221 can have a margin delay 222, which is measured as a distance between a center of a data window for calibrated state signal 201 and a center of a data window for signal 221. Alternatively, margin delay 222 can be measured as a distance between edge 211 of clock signal 108 and a center of a data window for signal 221. Margin delay 222 can be a measure of how much signal 221 is shifted from calibrated state signal 201.

Similarly, signal 223 can have a margin delay 224, and signal 225 can have a margin delay 226. Margin delay 222, margin delay 224, and margin delay 226 are left shifted margin delays. Margin delay 222 is smaller than margin delay 224, which is smaller than margin delay 226. When first set of data signals 113 is calibrated state signal 201, edge 211 is substantially aligned with the center of data window for calibrated state signal 201. Accordingly, sampling performed at edge 211 can obtain a correct data value for calibrated state signal 201.

In some embodiments, when first set of data signals 113 is signal 221, edge 211 is misaligned with the center of data window for signal 221 with margin delay 222. In some embodiments, margin delay 222 can have a value of 5 delay units determined by clock signal 108. A delay unit, or a minimal delay unit, may be determined based on clock signal 108, such as half a clock cycle or one clock cycle. As shown, sampling performed at edge 211 can capture the correct data value for signal 221 because edge 211 overlaps with data window of signal 221. Accordingly, if signal 221 is provided as first set of data signals 113 in iteration 110 to perform the memory test, the memory test result can indicate it is memory test success event 114.

In some embodiments, when first set of data signals 113 is signal 223, edge 211 is misaligned with the center of data window for signal 223 with margin delay 224. In some embodiments, margin delay 224 can have a value of 25 delay units. As shown, sampling performed at edge 211 can still capture the correct data value for signal 223. Accordingly, if signal 223 is provided as first set of data signals 113 in iteration 110 to perform the memory test, the memory test result can indicate it is memory test success event 114.

However, when first set of data signals 113 is signal 225, edge 211 can be misaligned with the center of data window for signal 225 with margin delay 226, which is larger than margin delay 222 and margin delay 224. In some embodiments, margin delay 226 can have a value of 26 delay units. As shown, sampling performed at edge 211 may complete miss the data window for signal 225. Accordingly, if signal 225 is provided as first set of data signals 113 in iteration 110 to perform the memory test, the memory test result can indicate it is memory test failure event 112.

In some embodiments, a difference between a first margin delay and a second margin delay, such as a difference between margin delay 222 and margin delay 224, can include a single delay unit based on clock signal 108 of electronic system 100. In some embodiments, a difference between the first margin delay and the second margin delay, such as a difference between margin delay 222 and margin delay 224, can include multiple delay units based on clock signal 108 of electronic system 100. In some embodiments, a binary search pattern or algorithm, or a linear search algorithm, may be used to determine the margin delay for the new set of data signals used to perform the memory test for memory device 107. For example, when a binary search algorithm is used, a set of data signals are provided with an initial pivot point of assumed margin delay for a memory test success event. If the memory test using the set of data signals with the initial pivot point of assumed margin delay produces a memory test success event, a new set of data signals can be provided for the next iteration memory test having a new pivot point that may be a multiple of the initial pivot point. If the memory test using the set of data signals with the initial pivot point of assumed margin delay produces a memory test failure event, a new set of data signals can be provided for the next iteration memory test having a new pivot point that may be half of the initial pivot point.

Figure 2C:
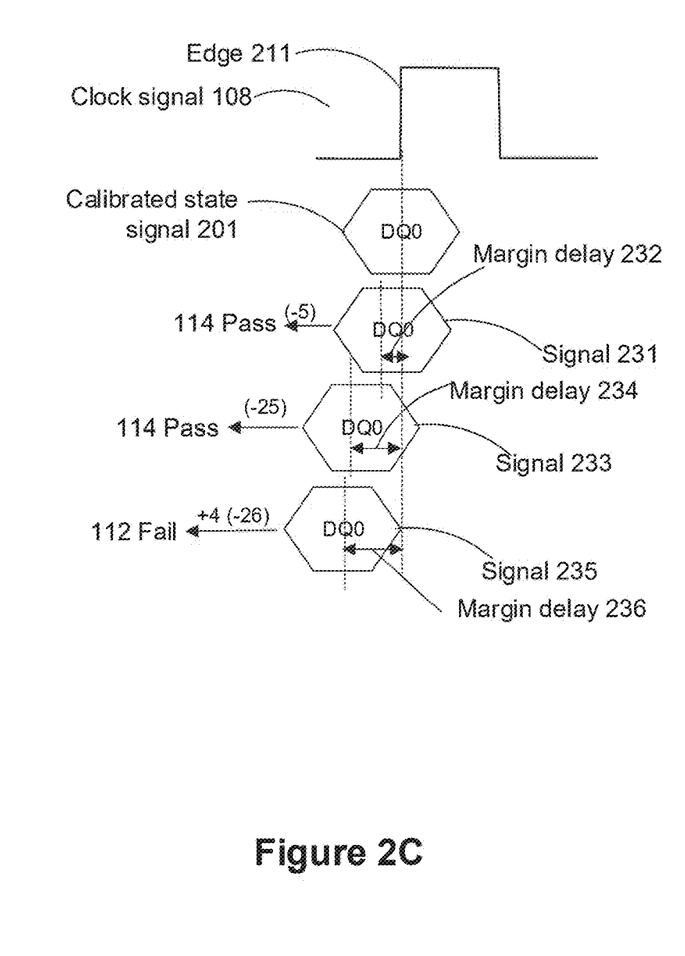

In some embodiments, examples of first set of data signals 113 with first margin delay 122 and second set of data signals 115 with second margin delay 124 are shown in FIG. 2C. Clock signal 108 can be the DQS transmitted through channel 120 or channel 130 together with a DQ, which can be a calibrated state signal 201, a signal 231, a signal 233, a signal 235, or other data signals. Signal 231, signal 233, and signal 235 can be examples of first set of data signals 113 or second set of data signals 115. Signal 231 can have a margin delay 232. Similarly, signal 233 can have a margin delay 234, and signal 235 can have a margin delay 236. Margin delay 232, margin delay 234, and margin delay 236 are right shifted margin delays. Margin delay 232 is smaller than margin delay 234, which is smaller than margin delay 236. Signal 231, signal 233, and signal 235 may be used similarly as signal 221, signal 223, and signal 225 as described above for FIG. 2B.

In some embodiments, in response to detecting memory test failure event 112 for the one or more failing byte lanes, processor circuit 101*a* can be configured to determine a timing margin 116 for the one or more failing byte lanes. Timing margin 116 represents a maximum shift in data signals provided to the one or more failing byte lanes that avoids memory test failure event 112 during the memory test. For example, as shown in FIG. 2B, since signal 225 has a margin delay value of 26 that can lead to memory test failure event 112 while signal 223 has a margin delay value of 25 that can lead to memory test success event 114, the maximum shift in data signals provided to the one or more failing byte lanes that avoids the memory test failure event would be margin delay 224 with a value of 25. Therefore, timing margin 116 has a value of 25 represented by margin delay 224 for signal 223. In some embodiments, timing margin 116 can be a difference between a start time of the calibrated state signal 201 determined by clock signal 108 and a previous iteration of the memory test with the detection of memory test success event 114 for all of the byte lanes, which is the iteration using signal 223, before the detection of memory test failure event 112 for the one or more failing byte lanes performed using signal 225.

In some embodiments, in response to detecting memory test failure event 112 for the one or more failing byte lanes, processor circuit 101*a* or memory controller circuit 105 can be configured to determine memory test failure addresses 149 within memory device 107 causing memory test failure event 112. Processor circuit 101*a* or memory controller circuit 105 can further identify the one or more failing byte lanes among the plurality of byte lanes corresponding to memory test failure addresses 149. For example, memory test failure addresses 149 at a first memory location may indicate that byte lane 121 has caused memory test failure event 112, while memory test failure addresses 149 at a second memory location may indicate that byte lane 123 has caused memory test failure event 112. In addition, processor circuit 101*a* or memory controller circuit 105 can be configured to determine timing margin 116 for the one or more failing byte lanes. Timing margin 116 for the one or more failing byte lanes can be the smallest timing margin among the plurality of byte lanes. For example, when memory test failure addresses 149 at the first memory location indicates that byte lane 121 has caused memory test failure event 112, byte lane 121 has the smallest timing margin 116 compared to other byte lanes such as byte lane 123, byte lane 125, byte lane 131, and byte lane 133.

In some embodiments, memory test signals can be generated based on a test pattern based memory test 117 to detect memory test failure event 112 for the one or more failing byte lanes. Processor circuit 101a or memory controller circuit 105 can be configured to read content 141 of memory device 107 at locations of the memory test pattern and compare content 141 at the locations of the memory test pattern with expected content 143 of memory device 107 at the locations to determine failing locations where content of the failing locations do not match the expected content at the failing locations. Processor circuit 101a or memory controller circuit 105 can be configured to translate the failing locations to the one or more failing byte lanes.

In some embodiments, the memory test can be buffer based memory test 119 with a first buffer 145 and a second buffer 147 to detect memory test failure event 112 for the one or more failing byte lanes. Processor circuit 101a or memory controller circuit 105 can be configured to compare content of first buffer 145 to content of second buffer 147 to determine whether the content of first buffer 145 matches the content of second buffer 147. In response to determining that the content of first buffer 145 does not match the content of second buffer 147, processor circuit 101a or memory controller circuit 105 can be configured to detect memory test failure addresses by replaying the buffer test. In some embodiments, the processor circuit can be configured to replay the buffer test up to one of the failing addresses, determine the expected value at the failing addresses, and further compare the two failing addresses to the expected value to determine whether one, or both, of the addresses have a failure.

Figure 3:
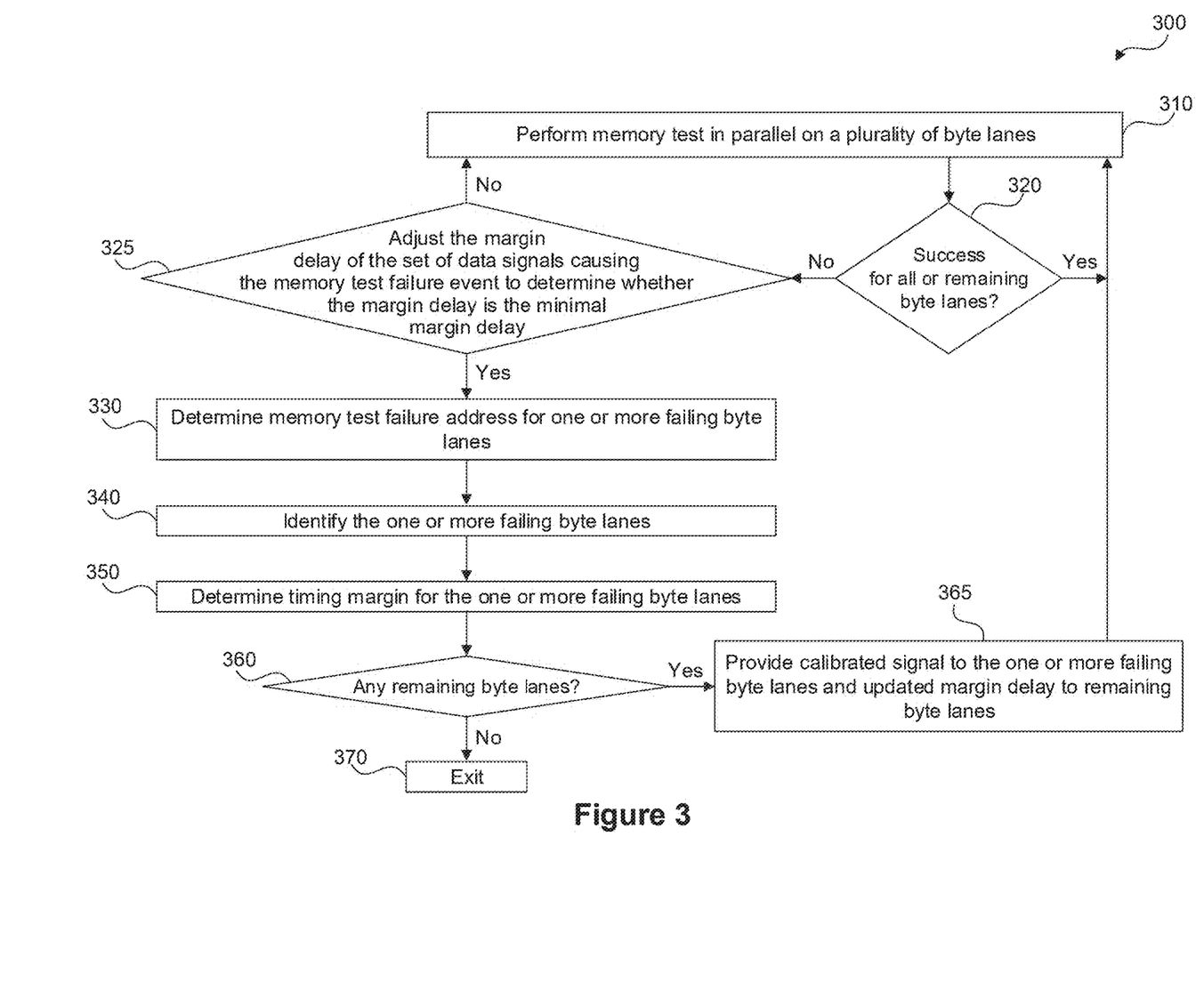
FIG. 3 is an illustration of a method performing timing margin testing in parallel for multiple byte lanes of a memory device, according to some embodiments.

FIG. 3 is an illustration of a method 300 to perform timing margin testing in parallel for multiple byte lanes of a memory device, according to some embodiments. For illustrative purposes, the operations illustrated in method 300 will be described with reference to electronic system 100 shown in FIG. 1. Other representations of systems for performing timing margin testing in parallel are within the scope of the present disclosure. Also, additional operations may be performed between various operations of method 300 and may be omitted merely for clarity and ease of description. The additional operations can be provided before, during, and/or after method 300, in which one or more of these additional operations are briefly described herein. Moreover, not all operations may be needed to perform the disclosure provided herein. Additionally, some of the operations may be performed simultaneously or in a different order than shown in FIG. 3. In some embodiments, one or more other operations may be performed in addition to or in place of the presently-described operations.

At operation 310, method 300 can include performing a memory test in parallel on a plurality of byte lanes to detect a memory test failure event for one or more failing byte lanes of the plurality of byte lanes or a memory test success event for all of the byte lanes. The memory test can be performed by providing a first set of data signals to the byte lanes, where the first set of data signals can be shifted by a first margin delay with respect to a calibrated state signal. For example, as shown in FIG. 1B, processor circuit 101a can be configured to perform memory test 129 by providing first set of data signals 113 to the byte lanes, such as byte lane 121, byte lane 123, byte lane 125, byte lane 131, and byte lane 133. First set of data signals 113 are shifted by first margin delay 122 with respect to calibrated state signal 111 defined with respect to clock signal 108. Referring to FIGS. 2B and 2C, example of first set of data signals 113 can include calibrated state signal 201, signal 221, signal 223, signal 225, signal 231, signal 233, or signal 235.

At operation 320, method 300 can include operations to analyze the memory test result to detect whether the memory test produces memory test success event 114 for all the byte lanes or for some of the remaining byte lanes if the timing margins have been determined for some of the byte lanes. If all of the or the remaining byte lanes result in memory test success event 114 ("YES"), then operation 310 is repeated. If memory test failure event 112 results for one or more byte lanes ("NO"), then operation 325 is performed.

In response to detecting memory test success event 114 for all of the plurality of byte lanes ("YES"), operation 310 is repeated with a second set of data signals provided to the plurality of byte lanes, where the second set of data signals are shifted by a second margin delay different from the first margin delay. For example, referring to FIGS. 1B and 2B, first set of data signals 113 can be calibrated state signal 201 provided to the plurality of byte lanes, such as byte lane 121, byte lane 123, byte lane 125, byte lane 131, and byte lane 133. Since calibrated state signal 201 is calibrated, memory test success event 114 will be detected. Therefore, at operation 310, method 300 can include repeating the memory test in iteration 110 of FIG. 1B by providing second set of data signals 115 to the plurality of byte lanes, where second set of data signals 115 are shifted by second margin delay 124 different from first margin delay 122. In some embodiments, second set of data signals 115 can be signal 221 having margin delay 222 that is different from the margin delay 0 for calibrated state signal 201 when an edge of the clock signal is aligned with a center of a data window of calibrated state signal 201. The memory test result for signal 221 can be analyzed at operation 320 again to detect memory test success event 114. Accordingly, signal 223 can be used as a next second set of data signals 115 that is provided to memory device 107 for memory testing at operation 310. The iterations can continue until memory test failure event 112 is detected.

At operation 325, in response to detecting memory test failure event 112 for one or more failing byte lanes, operations can be performed to adjust the margin delay of the set of data signals causing memory test failure event 112 to determine whether the margin delay is the minimal margin delay for the one or more failing byte lanes. For example, if a set of data signals with a margin delay value of 25 delay units causes memory test failure event 112 at operation 320, to determine the set of data signals has the minimal margin delay, at operation 325, a set of data signals with a margin delay value of 15 delay units can be generated, which is assumed not to be the minimal margin delay. Accordingly, at operation 325, the "NO" branch is taken for the newly generated set of data signals with a margin delay value of 15 delay units. Afterwards, at operation 310, using the set of data signals with a margin delay value of 15 delay units as input, memory test operations can be performed in parallel on the plurality of byte lanes to detect a memory test failure event. If the set of data signals with a margin delay value of 15 delay units results in memory test success event 114 for all of the plurality of byte lanes ("YES") at operation 320, a set of data signals with a margin delay value of 23 delay units can be generated, which has a higher margin delay than 15 delay units, but smaller than the margin value of 25 delay units causes memory test failure event 112. Iterations of operations can be performed at operation 320 to adjust the margin delay to detect and determine whether the set of data signals causing memory test failure event 112 has the minimum margin delay. At operation 325, a margin delay value is kept in a record when the margin delay value causes test failure event 112. The set of data signals causing memory test failure event 112 has the minimum margin delay value t when a set of data signals having a margin delay value t can lead to memory test success event 114 for all of the plurality of byte lanes, while the set of data signals having margin delay value t+1 causes test failure event 112. When such a minimum margin delay value t is detected, the "YES" branch will be taken at operation 325 to reach operation 330 shown below.

At operation 330, in response to a determination of the minimal margin delay for a set of data signals causing memory test failure event 112, test failure addresses 149 within memory device 107 causing memory test failure event 112 having the minimal margin delay are determined. For example, as shown above, memory test failure addresses 149 can be determined based on a test pattern based memory test 117 or buffer based memory test 119 by comparing memory contents.

At operation 340, the one or more failing byte lanes corresponding to memory test failure addresses 149 are identified. For example, memory test failure addresses 149 at a first memory location may indicate that byte lane 121 has caused memory test failure event 112, while memory test failure addresses 149 at a second memory location may indicate that byte lane 123 has caused memory test failure event 112. In some embodiments, different byte lanes can have different timing margins. Accordingly, not all byte lanes may have the same timing margin. Therefore, a smaller subset of one or more byte lanes of all byte lanes for memory device 107 can cause memory test failure event 112.

At operation 350, timing margin 116 for the one or more failing byte lanes is determined. Timing margin 116 for the one or more failing byte lanes can be a smallest timing margin among the plurality of byte lanes. For example, memory test failure addresses 149 at the first memory location indicates that byte lane 121 has caused memory test failure event 112, while memory test on other byte lanes produce a memory test success event. Since memory test on other byte lanes produce a memory test success event, timing margin for other byte lanes would be bigger than timing margin 116 detected for byte lane 121. Therefore, byte lane 121 has the smallest timing margin 116 compared to other byte lanes such as byte lane 123, byte lane 125, byte lane 131, and byte lane 133. For example, as shown in FIG. 2B, since signal 225 has a margin delay value of 26 delay units that can lead to memory test failure event 112 while signal 223 has a margin delay value of 25 delay units that can lead to memory test success event 114, the maximum shift in data signals provided to the one or more failing byte lanes that avoids memory test failure event 112 would be margin delay 224 having a value of 25 delay units. Therefore, timing margin 116 has a value of 25 delay units represented by margin delay 224 for signal 223. In some embodiments, timing margin 116 can be a difference between a start time of calibrated state signal 201 determined by clock signal 108 and a previous iteration of the memory test with the detection of memory test success event 114 for all of the plurality of byte lanes, which is the iteration using signal 223, before the detection of memory test failure event 112 for the one or more failing byte lanes performed using signal 225.

At operation 360, operations are performed to determine whether there are any remaining byte lanes that do not have the timing margin decided yet. If there are such remaining byte lanes, at operation 365, a calibrated signal is provided to the one or more failing byte lanes, and signals with an updated margin delay can be provided to the remaining byte lanes. In some embodiments, the one or more failing byte lanes having the timing margins determined at operation 350 is a first set of failing memory byte lanes, and the timing margin for the failing memory byte lanes is a first timing margin. The calibrated state signal can be restored to the first set of failing memory byte lanes as determined at operation 350, and further loop back to operation 310 to repeat the memory test in parallel on remaining byte lanes of the plurality of byte lanes. Since for the memory test performed at 310 at this time, calibrated state signals are provided to the first set of failing memory byte lanes, the first set of failing memory byte lanes would not produce a memory test failure event. Following the operations described above, method 300 can detect another memory test failure event 112 at 320 or detect memory test success event 114 for all of the plurality of byte lanes. In response to detecting the other memory test failure event for one or more of the remaining byte lanes, method 300 can determine a second set of failing memory byte lanes at operation 340, and determine a second timing margin for the second set of failing memory byte lanes at operation 350. The second timing margin can indicate a data signal provided to the second set of failing memory byte lanes causing a memory test failure when the data signal is shifted by a delay more than the second timing margin.

For example, when the one or more failing byte lanes are determined to be byte lane 121, the plurality of byte lanes include byte lane 121, byte lane 123, byte lane 125, byte lane 131, byte lane 133. The remaining byte lanes include byte lane 123, byte lane 125, byte lane 131, and byte lane 133. Therefore, byte lane 121 is the first set of failing memory byte lanes, and the timing margin for byte lane 121 is a first timing margin. Additional memory tests can be performed by looping back to operation 310 to repeat the memory test in parallel on remaining byte lanes of the plurality of byte lanes, which include byte lane 123, byte lane 125, byte lane 131, and byte lane 133. During this iteration of the memory test, calibrated state signals are provided to the first set of failing memory byte lanes, which is byte lane 121. Hence, byte lane 121 will not produce a memory test failure event. Following the operations described above from operation 310 to operation 360, method 300 can detect another memory test failure event 112 or detect memory test success event 114 for all of the plurality of byte lanes. In response to detecting memory test failure event 112, the second time for one or more of the remaining byte lanes, method 300 can determine a second set of failing memory byte lanes at operation 340, which may include byte lane 123, and determine a second timing margin for byte lane 123.

In addition, at operation 360, when there is no more remaining byte lanes for testing the timing margin, method 300 can finish the timing margin testing and exit at operation 370.

Embodiments of the present disclosure include a system for timing margin testing and determination in parallel for multiple byte lanes of multiple channels of a memory device coupled to one or more processor circuits. Data signals are provided to the multiple byte lanes in parallel to perform a memory test on the multiple byte lanes, where the data signals have a margin delay with respect to a calibrated state signal. One or more byte lanes with the smallest time margin can induce a memory test failure event. The timing margin represents a maximum shift in data signals provided to the failing byte lanes that avoids the memory test failure event during the memory test. Embodiments herein can identify one or more failing byte lanes among the byte lanes of the memory device. In response to detecting the memory test failure event for the one or more failing byte lanes, a timing margin for the one or more failing byte lanes can be determined. Afterwards, calibrated state signals can be provided to the one or more failing memory byte lanes having timing margins already determined, and the memory test can be repeated in parallel on remaining byte lanes to detect timing margins for the remaining byte lanes without retesting the one or more failing memory byte lanes having their timing margins already determined. Benefits of the disclosed embodiments, among others, include reduced cost and increased efficiency in determining the timing margins for the plurality of byte lanes in comparison to testing by sequence.

Figure 4:
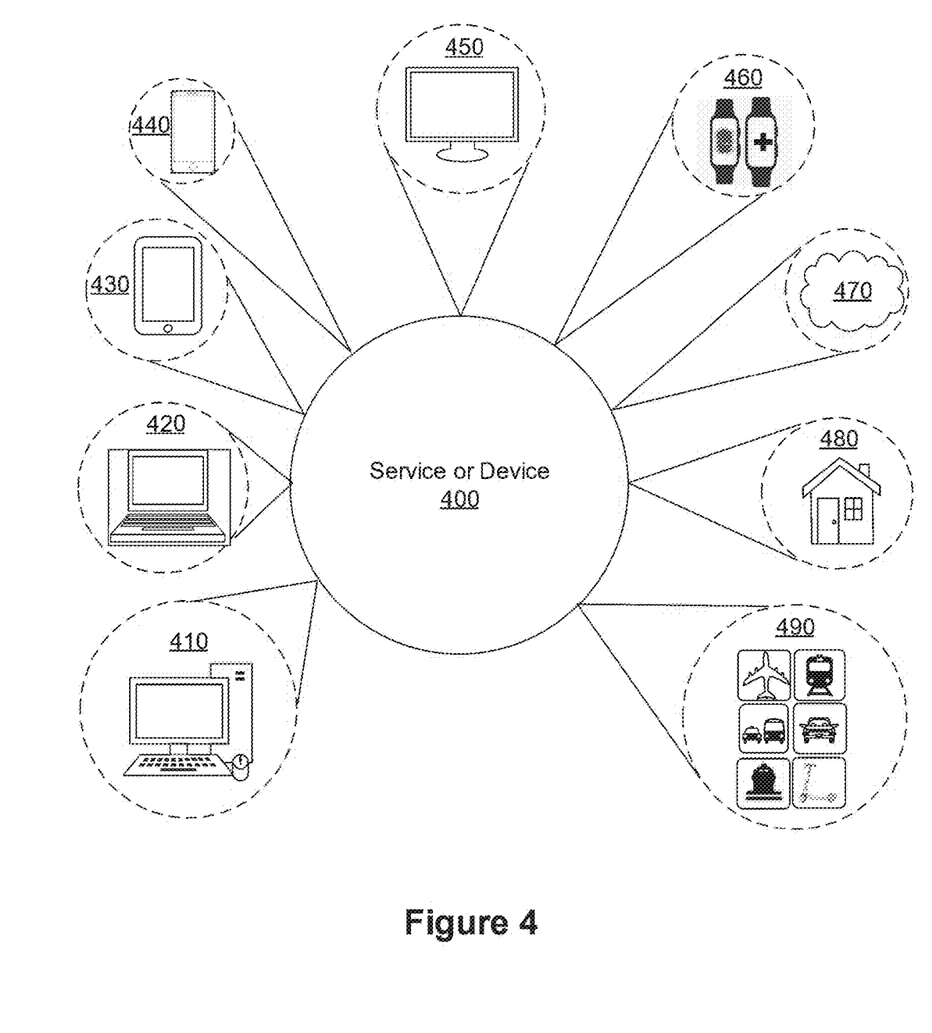
FIG. 4 is an illustration of exemplary systems or devices that can include the disclosed embodiments.

FIG. 4 is an illustration of exemplary systems or devices that can include the disclosed embodiments. System or device 400 can incorporate one or more of the disclosed embodiments such as electronic system 100 in a wide range of areas. For example, system or device 400 can be implemented in one or more of a desktop computer 410, a laptop computer 420, a tablet computer 430, a cellular or mobile phone 440, and a television 450 (or a set-top box in communication with a television).

Also, system or device 400 can be implemented in a wearable device 460, such as a smartwatch or a health-monitoring device. In some embodiments, the smartwatch can have different functions, such as access to email, cellular service, and calendar functions. Wearable device 460 can also perform health-monitoring functions, such as monitoring a user's vital signs and performing epidemiological functions (e.g., contact tracing and providing communication to an emergency medical service). Wearable device 460 can be worn on a user's neck, implantable in user's body, glasses or a helmet designed to provide computer-generated reality experiences (e.g., augmented and/or virtual reality), any other suitable wearable device, and combinations thereof.

Further, system or device 400 can be implemented in a server computer system, such as a dedicated server or on shared hardware that implements a cloud-based service 470. System or device 400 can be implemented in other electronic devices, such as a home electronic device 480 that includes a refrigerator, a thermostat, a security camera, and other suitable home electronic devices. The interconnection of such devices can be referred to herein as the "Internet of Things (IoT)." System or device 400 can also be implemented in various modes of transportation 490, such as part of a vehicle's control system, guidance system, and/or entertainment system.

The systems and devices illustrated in FIG. 4 are merely examples and are not intended to limit future applications of the disclosed embodiments. Other example systems and devices that can implement the disclosed embodiments include portable gaming devices, music players, data storage devices, and unmanned aerial vehicles.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system, comprising:
   a processor circuit;
   a memory device; and
   a memory controller circuit configured to control data transfer between the processor circuit and the memory device over a plurality of byte lanes;
   wherein the processor circuit is configured to:
      perform a memory test in parallel on the plurality of byte lanes to detect a memory test failure event for one or more failing byte lanes of the plurality of byte lanes or a memory test success event for all of the plurality of byte lanes, wherein the memory test is performed by providing a first set of data signals as input to multiple byte lanes of the plurality of byte lanes in parallel, and wherein the first set of data signals are shifted by a first margin delay with respect to a calibrated state signal; and
      in response to a detection of the memory test success event for all of the plurality of byte lanes, repeat the memory test by providing a second set of data signals to the plurality of byte lanes, and wherein the second set of data signals are shifted by a second margin delay different from the first margin delay.

2. The system of claim 1, wherein a difference between the first margin delay and the second margin delay comprises a single delay unit based on a clock signal of the system.

3. The system of claim 1, wherein a difference between the first margin delay and the second margin delay comprises multiple delay units based on a clock signal of the system.

4. The system of claim 1, wherein a difference between the first margin delay and the second margin delay is based on a binary search pattern or a linear search pattern.

5. The system of claim 1, wherein to repeat the memory test, the processor circuit is further configured to repeat the memory test with a set of data signals having an updated margin delay based on a prior iteration of the memory test until the memory test failure event is detected for the one or more failing byte lanes.

6. The system of claim 1, wherein the memory device includes a dynamic random access memory (DRAM).

7. The system of claim 1, wherein the memory controller circuit and the processor circuit are included in a system-on-chip (SOC), and wherein the SOC is configured to be in a functional mode disabled from calibration of the memory device during the memory test.

8. A system, comprising:
   a processor circuit; and
   a memory controller circuit configured to control data transfer between the processor circuit and a memory device over a plurality of byte lanes between the memory controller circuit and the memory device;
   wherein the processor circuit is configured to:

perform a memory test in parallel on the plurality of byte lanes to detect a memory test failure event for one or more failing byte lanes of the plurality of byte lanes or a memory test success event for all of the plurality of byte lanes, wherein the memory test is performed by providing a first set of data signals as input to multiple byte lanes of the plurality of byte lanes in parallel, and the first set of data signals are shifted by a margin delay with respect to a calibrated state signal; and in response to detecting the memory test failure event for the one or more failing byte lanes, determine a timing margin for the one or more failing byte lanes, wherein the timing margin represents a maximum shift in a second set of data signals provided to the one or more failing byte lanes that avoids the memory test failure event during the memory test.

9. The system of claim 8, wherein, in response to detecting the memory test failure event for the one or more failing byte lanes, the processor circuit is further configured to:
determine memory test failure addresses within the memory device causing the memory test failure event;
identify the one or more failing byte lanes among the plurality of byte lanes corresponding to the memory test failure addresses; and
determine the timing margin for the one or more failing byte lanes.

10. The system of claim 8, wherein the timing margin for the one or more failing byte lanes is a smallest timing margin among the plurality of byte lanes.

11. The system of claim 8, wherein the memory test is based on a memory test pattern to detect the memory test failure event for the one or more failing byte lanes, and wherein the processor circuit is further configured to:
read content of the memory device at locations of the memory test pattern;
compare the content at the locations of the memory test pattern with expected content of the memory device at the locations to determine failing locations where content of the failing locations do not match the expected content at the failing locations; and
translate the failing locations to the one or more failing byte lanes.

12. The system of claim 8, wherein the memory test is based on a buffer test with a first buffer and a second buffer to detect the memory test failure event for the one or more failing byte lanes, and wherein the processor circuit is further configured to:
compare content of the first buffer to content of the second buffer to determine whether the content of the first buffer matches the content of the second buffer; and
in response to determining that the content of the first buffer does not match the content of the second buffer, detect memory test failure addresses by replaying the buffer test.

13. The system of claim 8, wherein, in response to detecting the memory test success event for all of the plurality of byte lanes, the processor circuit is further configured to:
repeat the memory test by providing a third set of data signals to the plurality of byte lanes, wherein:
the third set of data signals are shifted by an other margin delay different from the margin delay,
the memory test continues until a detection of the memory test failure event for the one or more failing byte lanes, and the timing margin is a difference between a start time of the calibrated state signal determined by a clock signal of the system and a previous iteration of the memory test with the detection of the memory test success event for all of the plurality of byte lanes before the detection of the memory test failure event for the one or more failing byte lanes.

14. The system of claim 8, wherein the one or more failing byte lanes is a first set of failing memory byte lanes, the timing margin for the first set of failing memory byte lanes is a first timing margin, and the processor circuit is further configured to:
restore the calibrated state signal to the first set of failing memory byte lanes;
repeat the memory test in parallel on remaining byte lanes of the plurality of byte lanes without testing the first set of failing memory byte lanes to detect an other memory test failure event or to detect the memory test success event for all of the plurality of byte lanes;
determine a second set of failing memory byte lanes in response to detecting the other memory test failure event for one or more of the remaining byte lanes; and
determine a second timing margin for the second set of failing memory byte lanes, wherein the second timing margin indicates a data signal provided to the second set of failing memory byte lanes causes a memory test failure event when the data signal is shifted by a delay more than the second timing margin.

15. A method, comprising:
performing a memory test in parallel on a plurality of byte lanes to detect a memory test failure event for one or more failing byte lanes of the plurality of byte lanes or a memory test success event for all of the plurality of byte lanes, wherein:
the plurality of byte lanes is accessible by a processor circuit and couples a memory device to a memory controller circuit,
the memory test is performed by providing a first set of data signals as input to multiple byte lanes of the plurality of byte lanes in parallel, and
the first set of data signals are shifted by a first margin delay with respect to a calibrated state signal; and
in response to detecting the memory test success event for all of the plurality of byte lanes, repeating the memory test by providing a second set of data signals to the plurality of byte lanes, wherein the second set of data signals are shifted by a second margin delay different from the first margin delay.

16. The method of claim 15, wherein a difference between the first margin delay and the second margin delay comprises a single delay unit or multiple delay units based on a clock signal of a system.

17. The method of claim 15, wherein the repeating the memory test comprises repeating the memory test with a set of data signals having an updated margin delay based on a prior iteration of the memory test until the memory test failure event is detected for the one or more failing byte lanes.

18. The method of claim 15, wherein the memory test is a first memory test, and the method further comprises:
performing a second memory test in parallel on the plurality of byte lanes to detect a second memory test failure event for a second set of one or more failing byte lanes of the plurality of byte lanes or a second memory test success event for all of the plurality of byte lanes;
in response to detecting the second memory test failure event for the second set of one or more failing byte lanes, determine a timing margin for the second set of one or more failing byte lanes, wherein the timing margin represents a maximum shift in second data signals provided to the second set of one or more failing byte lanes that avoids the memory test failure event during the memory test.

19. The method of claim 15, wherein performing the memory test in parallel on the plurality of byte lanes to detect the memory test failure event for the one or more failing byte lanes comprises:
   reading content of the memory device at locations of a memory test pattern;
   comparing the content at the locations of the memory test pattern with expected content of the memory device at the locations to determine failing locations where content of the failing locations do not match the expected content at the failing locations; and
   translating the failing locations to the one or more failing byte lanes.

20. The method of claim 15, wherein performing the memory test in parallel on the plurality of byte lanes to detect the memory test failure event for the one or more failing byte lanes comprises:
   comparing, based on a buffer test, content of a first buffer to content of a second buffer to determine whether the content of the first buffer matches the content of the second buffer; and
   in response to determining that the content of the first buffer does not match the content of the second buffer, detect memory test failure addresses by replaying the buffer test.

* * * * *